(12) United States Patent
Kimura

(10) Patent No.: US 9,232,504 B2
(45) Date of Patent: Jan. 5, 2016

(54) BASE STATION APPARATUS, COMMUNICATION SYSTEM, AND COMMUNICATION METHOD

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 13/861,983

(22) Filed: Apr. 12, 2013

(65) Prior Publication Data

US 2013/0230001 A1  Sep. 5, 2013

Related U.S. Application Data

(63) Continuation of application No. PCT/JP2010/070591, filed on Nov. 18, 2010.

(51) Int. Cl.
*H04W 72/04* (2009.01)
*H04L 1/00* (2006.01)
*H04W 92/20* (2009.01)
*H04L 5/00* (2006.01)

(52) U.S. Cl.
CPC ......... *H04W 72/0406* (2013.01); *H04L 1/0003* (2013.01); *H04L 5/0062* (2013.01); *H04L 5/0073* (2013.01); *H04L 1/0009* (2013.01); *H04L 5/0053* (2013.01); *H04W 92/20* (2013.01)

(58) Field of Classification Search
CPC ..... H04L 5/0053; H04L 1/009; H04L 5/0062; H04L 1/0003; H04L 5/0073; H04W 92/20; H04W 72/0406
See application file for complete search history.

(56) References Cited

U.S. PATENT DOCUMENTS

| | | | |
|---|---|---|---|
| 2007/0097938 A1* | 5/2007 | Nylander et al. | . H04L 29/12066 370/338 |
| 2009/0190540 A1* | 7/2009 | Harada et al. | ..... H04W 72/1273 370/329 |
| 2009/0305741 A1 | 12/2009 | Takeuchi et al. | |
| 2010/0069063 A1* | 3/2010 | Osterling et al. | ..... H04W 36/20 455/434 |
| 2010/0151852 A1 | 6/2010 | Mori et al. | |

FOREIGN PATENT DOCUMENTS

| | | |
|---|---|---|
| JP | 03-201832 | 9/1991 |
| JP | 2009-510971 A | 3/2009 |
| JP | 2009-302614 A | 12/2009 |

(Continued)

OTHER PUBLICATIONS

Japanese Office Action issued Oct. 7, 2014; Application No. 2012-544060, with English Translation.
International Search Report issued in PCT/JP2010/070591, mailed Dec. 21, 2010, 5 pages.
Japanese Office Action Application No. 2012-544060 dated Apr. 1, 2014 with English translation of the Office Action.

(Continued)

*Primary Examiner* — Ajay Cattungal
(74) *Attorney, Agent, or Firm* — Arent Fox LLP

(57) ABSTRACT

A first base station apparatus that forms a first cell, the first base station apparatus includes an assigning unit that assigns a radio resource for a control channel between a mobile station apparatus and the first base station apparatus, and a first transmitting unit that transmits radio resource information indicating the radio resource assigned for the control channel to the second base station apparatus forming a second cell that is different from the first cell.

2 Claims, 18 Drawing Sheets

(56) References Cited

FOREIGN PATENT DOCUMENTS

| | | |
|---|---|---|
| JP | 2010/509815 A | 3/2010 |
| WO | WO 2008/090764 A1 | 7/2008 |
| WO | WO 2008/136416 A1 | 11/2008 |
| WO | WO 2009/129261 A1 | 10/2009 |
| WO | WO 2010/073700 A1 | 7/2010 |
| WO | WO 2010/079560 A1 | 7/2010 |
| WO | WO 2010/079824 A1 | 7/2010 |

OTHER PUBLICATIONS

Japanese Office Action issued Apr. 28, 2015; Japanese Application No. 2012-544060.

ZTE. "Performance analysis of PDCCH interference mitigation techniques in Outdoor Hotzone Het-Net". Discussion and decision. 3GPP TSG RAN WG1 Meeting #61bis. Dresden, Germany, Jun. 28-Jul. 2, 2010. R1-104166.

* cited by examiner

BASE STATION APPARATUS, COMMUNICATION SYSTEM, AND COMMUNICATION METHOD

CROSS-REFERENCE TO RELATED APPLICATIONS

This application is a continuation application based on International application No. PCT/JP2010/070591, filed on Nov. 18, 2010, the entire contents of which are incorporated herein by reference.

FIELD

The embodiments discussed herein relate to a base station apparatus used for a radio access network.

BACKGROUND

A radio access network provided in a mobile communication system includes mobile station apparatuses used by users, and base station apparatuses each of which is connected to mobile station apparatuses through a radio interface, and is connected to a ground-based communication network. Each base station apparatus forms a cover area referred to as a cell, and establishes a radio link with the mobile station apparatuses located in the cell which is subject to cover. A base station apparatus receives an uplink radio signal transmitted by mobile station apparatuses in a cell, and transfers user data transmitted from mobile station apparatuses to the ground-based network.

As prior art, a wireless base station that prevents deterioration in reception quality due to of interference of a downlink signal from another base station is proposed. The wireless base includes a reference information storing unit for storing reference information necessary for receiving a control signal transmitted from a mobile station, a first control signal receiving unit for receiving a first uplink control signal used by a mobile station connected to the wireless base station to notify the wireless base station of a reception state of the downlink signal, and for requesting the power control unit to control the power based on the received first uplink control signal, and a second control signal receiving unit for receiving a second uplink control signal used by a mobile station connected to the neighbor base station to notify the neighbor base station of a reception state of the downlink signal and, by referring to the reference information stored in the reference information storing unit, for requesting the power control unit to control the power based on a content of the received second uplink control signal. The transmission power of the downlink signal is controlled based on the request to control the transmission power from the first control signal receiving unit and the request to control the transmission power from the second control signal receiving unit. Related art is disclosed in Japanese Laid-open Patent Publications No. 2009-302614.

SUMMARY

According to another aspect of the embodiments, a first base station apparatus which forms a first cell is provided. The first base station apparatus includes an assigning unit which assigns a radio resource for a control channel between a mobile station apparatus and the first base station apparatus, and a first transmitting unit which transmits radio resource information indicating the radio resource assigned for the control channel to the second base station apparatus forming a second cell which is different from the first cell.

According to another aspect of the embodiments, a second base station apparatus which forms a second cell. The second base station apparatus includes a first receiving unit which receives radio resource information from a first base station apparatus forming a first cell which is different from the second cell, and a second receiving unit which receives control information transmitted to a mobile station apparatus from the first base station apparatus through a control channel to which the radio resource indicated by the radio resource information is assigned.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

PREFERRED MODES FOR CARRYING OUT THE INVENTION

A case is assumed in which a radio access network includes a first cell formed by a first base station apparatus and a second cell formed by a second base station apparatus, and the first cell and the second cell are adjacent to each other. When a mobile station apparatus located in the first cell is connected to the first base station apparatus, and the mobile station apparatus and the first base station apparatus communicates, an uplink radio signal transmitted from the mobile station apparatus may arrive at the second base station apparatus. Such a radio signal which comes from the mobile station apparatus of adjacent cell serves as an interference signal, and degrades uplink receiving characteristic in the second mobile station apparatus. However, in the second base station, the transmission manner of mobile station apparatus located in the first cell is unknown, and therefore it is difficult to reduce the interference.

It is an object of an apparatus and method according to the embodiments to prevent or reduce interference by transmission signals from the mobile station apparatus located in an adjacent cell.

Figure 1:
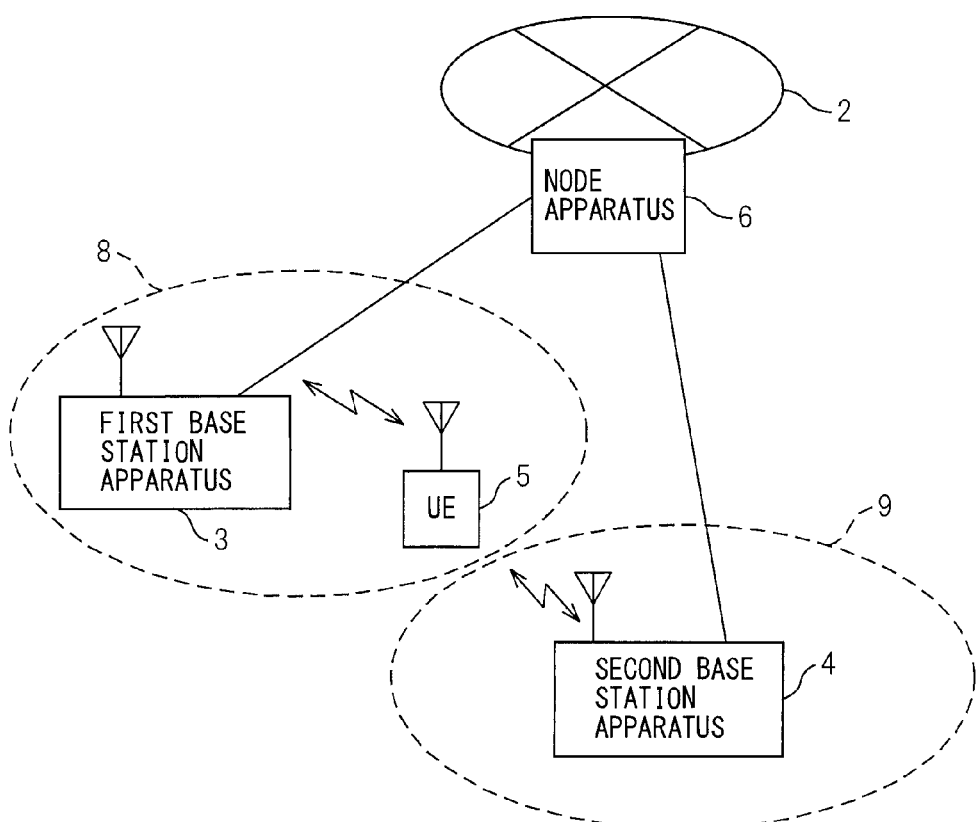
FIG. 1 is an overall schematic diagram of communication system.

Hereinafter, preferable embodiments will be illustrated with reference to the accompanying drawings. FIG. 1 is an overall schematic diagram of communication system. A communication system 1 includes a communication network 2, a first base station apparatus 3, a second base station apparatus 4, and user equipment (UE) 5 which serves as a mobile station apparatus.

The first base station apparatus 3 and the second base station apparatus 4 wirelessly communicates with the user equipment 5 for data transmission between the communication network 2 which is a wired network and the user equipment 5. The first base station apparatus 3 and the second base station apparatus 4 form a first cell 8 and a second cell 9, respectively. Moreover, the communication system 1 may include a node apparatus 6 which connects the first base station apparatus 3 and the second base station apparatus 4 to the communication system 1, respectively.

In one embodiment, the communication system 1 may be a communication system which conforms to 3GPP (Third Generation Partnership Project)-LTE (Long Term Evolution). In this case, the node apparatus 6 may be S-GW (Serving-Gateway), for example. Note that the embodiments of the communication system described herein is not restrictively applied to the communication system defined in LTE, but can be applicable to various kinds of mobile communication systems.

The communication system 1 may include an inter-base-station communication interface which enables communication between the first base station apparatus 3 and the second base station apparatus 4. The inter-base-station communication interface may be an interface through which the first base station apparatus 3 and the second base station apparatus 4 directly communicate with each other, and may be an interface through which communication is performed via other network components in the communication system 1. For example, in the example of LTE, the inter-base-station communication interface may be an X2 interface.

Hereinafter, an example in which the first cell 8 and the second cell 9 are adjacent to each other will be illustrated. Moreover, the example in which the user equipment 5 is located in the first cell 8, and communicates with the first base station apparatus 3 by establishing a radio link with the first base station apparatus 3 will be illustrated.

Figure 2:
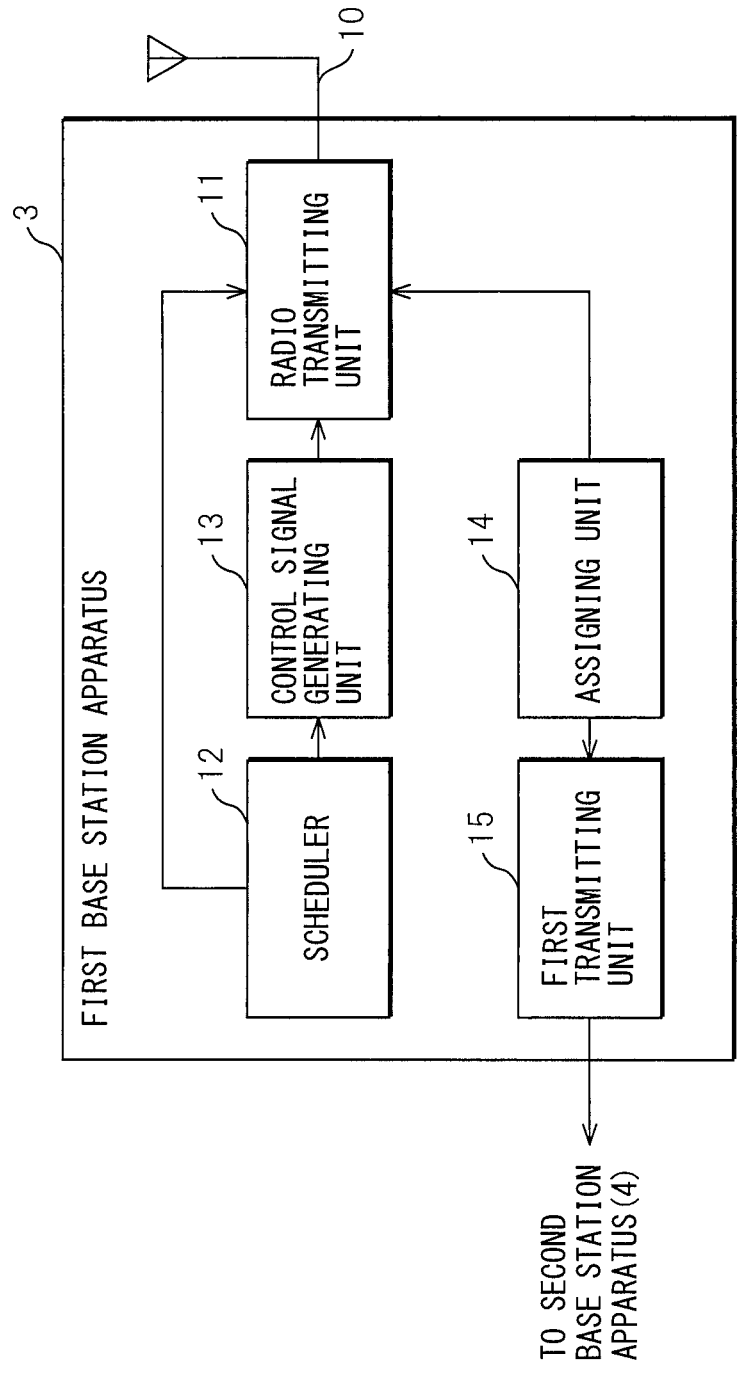
FIG. 2 is a schematic diagram depicting a first example of a first base station apparatus.

FIG. 2 is a schematic diagram depicting a first example of the first base station apparatus 3. The first base station apparatus 3 includes an antenna 10, a radio transmitting unit 11, a scheduler 12, a control signal generating unit 13, an assigning unit 14, and a first transmitting unit 15. FIG. 2 and other drawings depicting other configuration examples of the first base station apparatus 3 mainly depict the components related to the illustration of the present embodiments among the components of the first base station apparatus 3.

The radio transmitting unit 11 transmits a predetermined control signal generated by the control signal generating unit 13 to the user equipment 5 through the antenna 10. The scheduler 12 assigns radio resources to a channel on which the user equipment 5 transmit an uplink signal, and to a channel on which the first base station apparatus 3 transmits a downlink signal to the user equipment 5, respectively. The radio transmitting unit 11 transmits a radio signal to the user equipment 5 in accordance with assignment of the radio resources determined by the scheduler 12.

The control signal generating unit 13 generates a predetermined control signal for controlling transmission of the uplink signal by the user equipment 5. In one embodiment, the predetermined control signal may include a signal which indicates the assigned radio resource in order for the user equipment 5 to transmit the uplink signal, for example.

Moreover, in one embodiment, the predetermined control signal may include a parameter for performing a channel estimation of a transmission channel through which signals are transmitted to the base station apparatus from the user equipment 5. In an example of LTE, the predetermined control signal may be a control signal transmitted by PDCCH (Physical Downlink Control Channel).

The assigning unit 14 assigns the radio resource to the channel through which the predetermined control signal generated for the user equipment 5 by the control signal generating unit 13 is transmitted. The radio transmitting unit 11 transmits the predetermined control signal generated by the control signal generating unit 13 in a specific position on the radio resource assigned by the assigning unit 14.

Note that it is sufficient to decide the range of the radio resources assigned by the assigning unit 14 so that the range can include the radio resource (which is decided by the radio transmitting unit 11) used for transmitting the predetermined control signal to the user equipment 5. In other words, the radio resource quantity assigned by the assigning unit 14 may be larger than the radio resource quantity used for transmitting the predetermined control signal to the user equipment 5.

In one embodiment, the predetermined control signal to the user equipment 5 is transmitted with control information to other user equipment on the radio resource assigned by the assigning unit 14, for example. The radio transmitting unit 11 may multiplex the control information items to respective user equipment into the radio resource assigned by the assigning unit 14, in accordance with a predetermined rule which uses identifiers of the user equipment.

For example, multiplexing of the control information items may be performed by utilizing the radio resources (subcarriers and OFDM symbols) used in different subframes for every user equipment. The user equipment may perform a receiving process such as demodulation and decoding for a plurality of radio resource patterns determined by the identifier, and thereby the control information addressed to own equipment can be recognized by checking CRC masked by the identifier.

The first transmitting unit 15 transmits the radio resource information which indicates the radio resource assigned by the assigning unit 14 to the second base station apparatus 4 through the inter-base-station communication interface. In one embodiment, the first transmitting unit 15 may transmit the identifier of the user equipment 5 controlled by the predetermined control signal to which the radio resources are assigned by the assigning unit 14, to the second base station apparatus 4 through the inter-base-station communication interface. For example, in the example of LTE, the identifier may be C-RNTI (Cell Radio Network Temporary Identifier).

Figure 3:
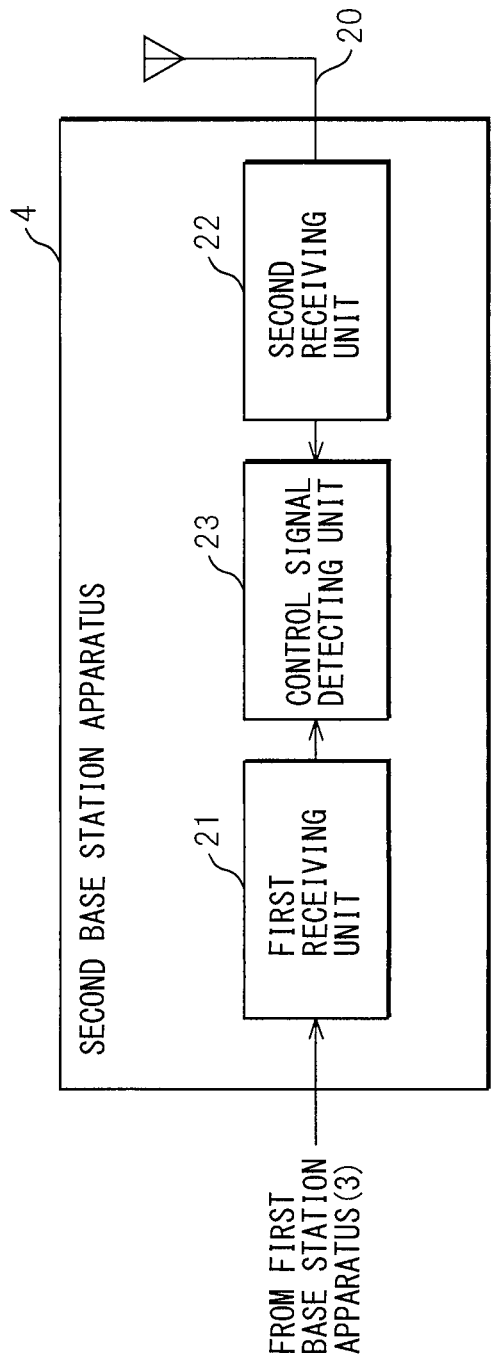
FIG. 3 is a schematic diagram depicting a first example of a second base station apparatus.

FIG. 3 is a schematic diagram depicting a first example of the second base station apparatus 4. The second base station apparatus 4 includes an antenna 20, a first receiving unit 21, a second receiving unit 22, and a control signal detecting unit 23. FIG. 3 and other drawings depicting other configuration examples of the second base station apparatus 4 mainly depict the components related to the illustration of the present embodiments among the components of the second base station apparatus 4.

The first receiving unit 21 receives the radio resource information transmitted from the first base station apparatus 3 through the inter-base-station communication interface. In an embodiment in which the first base station apparatus 3 transmits a user equipment identifier, the first receiving unit 21 may receive the user equipment identifier through the inter-base-station communication interface.

The second receiving unit 22 receives the uplink signal transmitted from the user equipment located in the second cell 9 through the antenna 20. The antenna 20 also receives the radio signal transmitted from the first base station apparatus 3 to the user equipment 5 and the radio signal transmitted from the user equipment 5 to the first base station apparatus 3. The second receiving unit 22 receives the radio signal transmitted from the first base station apparatus 3 to the user equipment 5.

The control signal detecting unit 23 detects the predetermined control information transmitted on the radio resource indicated by the radio resource information received by the first receiving unit 21, from among the received signals received by the second receiving unit 22.

In one embodiment, the range of the radio resource indicated by the radio resource information may include the radio resource on which the predetermined control signal is transmitted to the user equipment 5, and the radio resource on which the control information to other user equipment is transmitted. In this case, the control signal detecting unit 23 separates the predetermined control signal to the user equipment 5, which have been multiplexed in the radio resources indicated by the radio resource information, from other control signals using the identifier of the user equipment 5 received from the first base station apparatus 3. For example, in LTE, the control signal detecting unit 23 detects PDCCH for the user equipment 5 from the range of the radio resource indicated by the radio resource information by using C-RNTI.

Figure 4:
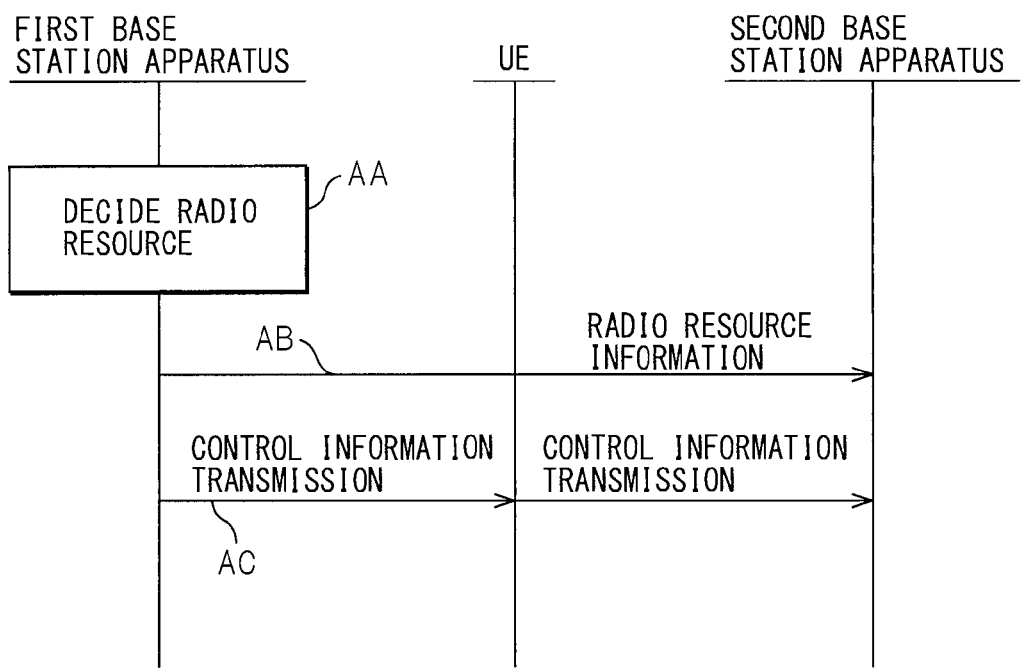
FIG. 4 is an explanatory diagram of a first example of processes in the first base station apparatus and the second base station apparatus.

FIG. 4 is an explanatory diagram of a first example of processes in the first base station apparatus 3 and the second base station apparatus 4. Note that each of following operations AA to AC may be a step in other embodiments.

In the operation AA, the assigning unit 14 of the first base station apparatus 3 decides the radio resource to be assigned to a channel on which the predetermined control signal for controlling the transmission of the uplink signal by the user equipment 5 is transmitted.

In the operation AB, the first transmitting unit 15 of the first base station apparatus 3 transmits the radio resource information indicating the radio resource assigned by the assigning unit 14 to the second base station apparatus 4 through the inter-base-station communication interface. The first receiving unit 21 of the second base station apparatus 4 receives the radio resource information transmitted from the first base station apparatus 3.

In the operation AC, the radio transmitting unit 11 of the first base station apparatus 3 transmits the predetermined control signal generated by the control signal generating unit 13 in a specific position on the radio resource assigned by the assigning unit 14. The second receiving unit 22 of the second base station apparatus 4 receives the radio signal transmitted from the first base station apparatus 3. The control signal detecting unit 23 detects the predetermined control information transmitted on the radio resource indicated by the radio resource information received by the first receiving unit 21, from among the received signals received by the second receiving unit 22.

According to the present embodiment, the second base station apparatus 4 can acquire the control signal of the user equipment 5 transmitted from the first base station apparatus 3 of the adjacent cell 8. For this reason, the present embodiment enables the second base station apparatus 4 to prevent or reduce the negative effect due to the interference signal which comes from the user equipment 5 utilizing the acquired control signal.

For example, when the predetermined control signal includes the parameter for the channel estimation of the transmission channel from the user equipment 5, the second base station apparatus 4 can remove an interference signal from the user equipment 5 by performing the interference removal technique using multi-antenna on the acquired parameter. For example, when the predetermined control signal includes the information on the radio resource assigned to the uplink signal from the user equipment 5, the second base station apparatus 4 can prevent or reduce the interference signal from the user equipment 5 by the scheduling based on the acquired information.

Moreover, according to the present embodiment, the second base station apparatus 4 acquires the control signal for controlling the user equipment 5 from the transmission channel on which the first base station apparatus 3 transmits to the user equipment 5. Therefore, it is possible to avoid a delay which may occur when transmitting the control information through the inter-base-station communication interface.

In other words, even if the control signal is such that changes frequently on every transmission frame, the second base station apparatus 4 can receive at the same timing as the user equipment 5 receives. Therefore, according to the present embodiment, it is possible to produce the time for the process which prevents or reduces the interference due to the signal transmitted from the user equipment 5.

Note that the first cell 8 and the second cell 9 may be substantially the same size. Alternatively, for example, the sizes of cover areas by the cells may have a difference so that one is a macro cell and the another is a femtocell.

For example, when the cover area of the first cell 8 is larger than the cover area of the second cell 9, the influence is increased by the interference signal which arrives at the second base station apparatus 4 from the user equipment 5 close to the cell boundary between the first cell 8 and the second cell 9. According to the present embodiment, even in such case, the interference signal by which the second base station apparatus 4 is affected can be prevented or reduced.

Figure 5:
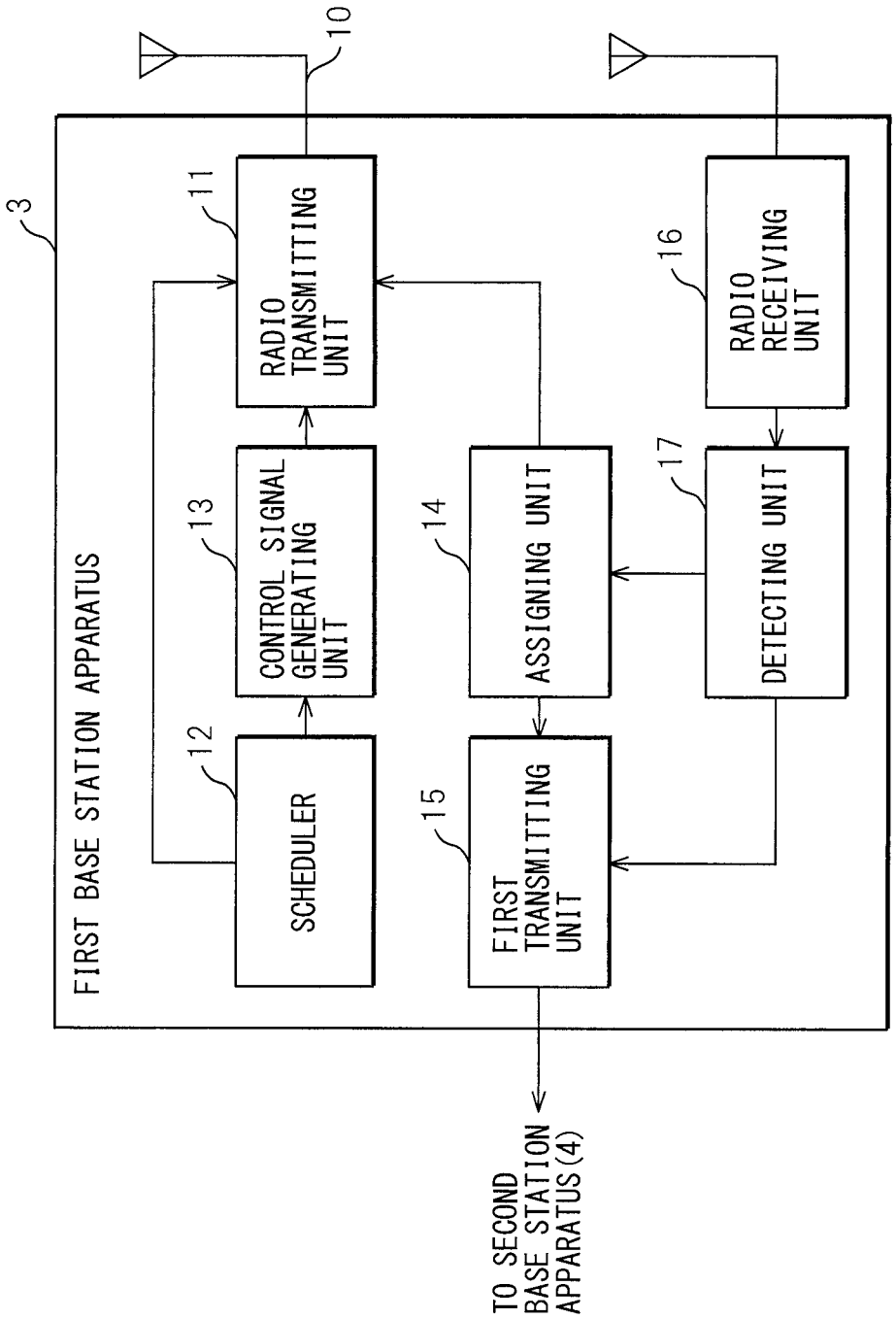
FIG. 5 is a schematic diagram depicting a second example of the first base station apparatus.

Next, another embodiment of the first base station apparatus 3 will be described. FIG. 5 is a schematic diagram depicting a second example of the first base station apparatus 3. The first base station apparatus 3 includes the components which is substantially the same as the components in above-described another embodiment. The same referential marks are given to the components corresponding to the components in another embodiment, and illustration is omitted about the same function. The first base station apparatus 3 includes a radio receiving unit 16 and a detecting unit 17.

The radio receiving unit 16 receives the signal transmitted from the user equipment 5 in the first cell 8. The detecting unit 17 detects the user equipment 5 by which the interference of the second base station apparatus 4 satisfies a predetermined first condition from among the user equipment 5 in the first cell 8.

In order to determine whether or not the first condition is satisfied, various determining methods can be employed. For example, the radio receiving unit 16 may receive the signal which indicates the received power intensity from each base station apparatus measured at the user equipment 5. For example, in LTE, the radio receiving unit 16 may receive an RSRP (Reference Signal Received Power) report value from the user equipment 5. The detecting unit 17 may determine whether or not the interference which affects the second base station apparatus 4 satisfies the predetermined first condition in accordance with the received power intensity from the second base station apparatus 4 measured at the user equipment 5.

For example, the detecting unit 17 may determine that the first condition is satisfied, when the received power intensity from the second base station apparatus 4 exceeds a predetermined threshold. This is because the intensity of the interference radio wave which arrives from the user equipment 5 to the second base station apparatus 4 is also strong, when the received power intensity from the second base station apparatus 4 is strong. Moreover, the detecting unit 17 may determine that the first condition is satisfied, for example, when a ratio of the received power intensity from the second base station apparatus 4 to the received power intensity from the first base station apparatus 3 exceeds a predetermined threshold.

Moreover, for example, the detecting unit 17 may determine whether or not the interference which affects the second base station apparatus 4 satisfies the predetermined first condition, based on position information on the user equipment 5 and position information on the second base station apparatus 4.

The assigning unit 14 assigns radio resource to the channel for transmitting the predetermined control signal generated for the user equipment 5 detected by the detecting unit 17.

According to the present embodiment, if the user equipment 5 which largely interferences with the second base station apparatus 4 is detected, it is possible to prevent or reduce the interference signal which comes from the user equipment 5.

Figure 6:
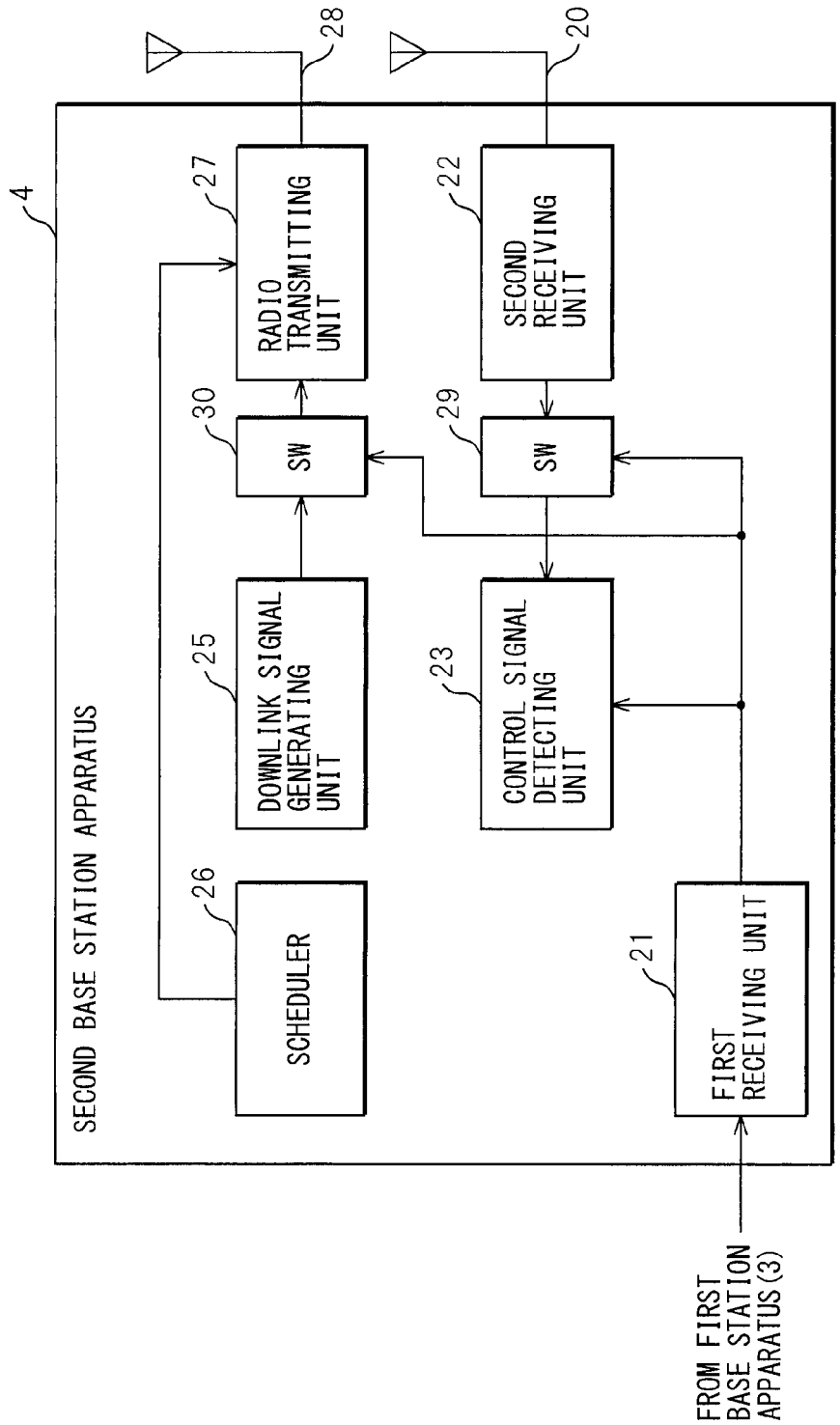
FIG. 6 is a schematic diagram depicting a second example of the second base station apparatus.

Next, another embodiment of the second base station apparatus 4 will be described. FIG. 6 is a schematic diagram depicting a second example of the second base station apparatus 4. The second base station apparatus 4 includes the components which is similar to the components in above-described another embodiment. The same referential marks are given to the components corresponding to the components in another embodiment, and illustration is omitted about the same function. Moreover, the components of the present embodiment may be combined with the components in other following embodiments.

The second base station apparatus 4 includes a downlink signal generating unit 25, a scheduler 26, a radio transmitting unit 27, an antenna 28, and switches (SW) 29 and 30. The downlink signal generating unit 25 generates the downlink signal transmitted to the user equipment in the second cell 9 from the second base station apparatus 4. The scheduler 26 decides the radio resource to be assigned to the channel on which the downlink signal is transmitted. The radio transmitting unit 27 transmits the downlink signal on the radio resource assigned by the scheduler 26 through the antenna 28.

The switch 29 inputs, into the control signal detecting unit 23, the signal on the radio resource designated by the radio resource information which is received by the first receiving unit 21, from among the signals received in the second receiving unit 22, and stops an input of the other signals. For example, when the range of the radio resource is designated by the period during which the control signal is transmitted, the switch 29, within the period during which the control signal is transmitted, allows the input of the received signal into the control signal detecting unit 23 from the second receiving unit 22, and prohibits the input during other period. For example, when the range of the radio resource is designated by carrier frequency on which the control signal is transmitted, the switch 29 allows the input of the received signal into the control signal detecting unit 23 from the second receiving unit 22 with respect to a career on which the control signal is transmitted, and blocks the signal on the other careers.

The switch 30 stops a transmission of the downlink signal on the radio resource designated by the radio resource information received by the first receiving unit 21. For example, when the range of the radio resource is designated by the period during which the control signal is transmitted, the switch 30 stops the transmission of the downlink signal during such a period that the control signal is transmitted, and allows the transmission of the downlink signal during other period. For example, when the range of the radio resource is designated by carrier frequency on which the control signal is transmitted, the switch 30 stops the transmission of the downlink signal by the career on which the control signal is transmitted, and allows the transmission of the downlink signal on other career.

Figure 7:
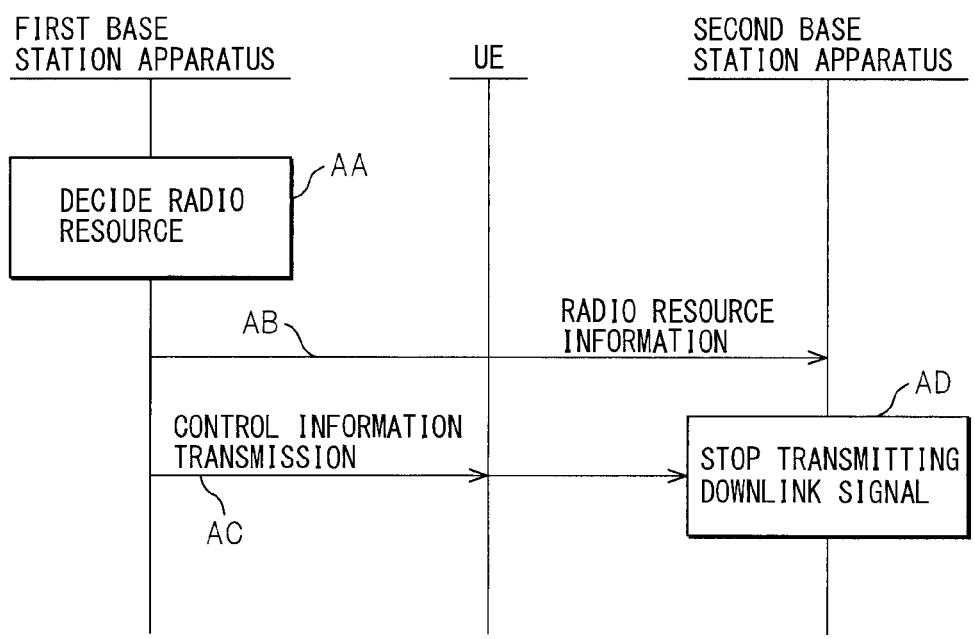
FIG. 7 is an explanatory diagram of a second example of processes in the first base station apparatus and the second base station apparatus.

FIG. 7 is an explanatory diagram of a second example of processes in the first base station apparatus 3 and the second base station apparatus 4. Note that each of following operations AA to AD may be a step in other embodiments. Moreover, the operations AA to AC are similar to the processes described with reference to FIG. 4.

In the operation AD, the switch 30 of the second base station apparatus 4 stops the transmission of the downlink signal on the radio resource designated by the radio resource information received by the first receiving unit 21.

According to the present embodiment, the transmission of the radio signal from the second base station apparatus 4 is stopped during such a period that the predetermined control signal to the user equipment 5 is transmitted, which prevents the interference between the transmission signal from the second base station apparatus 4 and the predetermined control signal. Therefore, the second base station apparatus 4 can receive the predetermined control signal to the user equipment 5 more reliably.

According to the present embodiment, it is difficult for the second base station apparatus 4 to transmit the downlink signal on the radio resource designated by the radio resource information which is transmitted from the first base station apparatus 3. Therefore, the assigning unit 14 of the first base station apparatus 3 preferably limits the range of the radio resource to be assigned to the channel for transmitting the predetermined control signal to the user equipment 5, and thereby reduces the throughput degradation of the downlink signal of the second base station apparatus 4.

In other words, the assigning unit 14 limits the range of the radio resource to be assigned to the control channel on which the predetermined control signal is transmitted to the user equipment 5, to a part of range of the radio resource designated in advance as an assignable range to the control channel. The assignable range may be a range designated by a technical standard. Hereinafter, a limitation method of the radio resource assigned to the control channel on which the predetermined control signal is transmitted will be exemplified.

Figure 8:
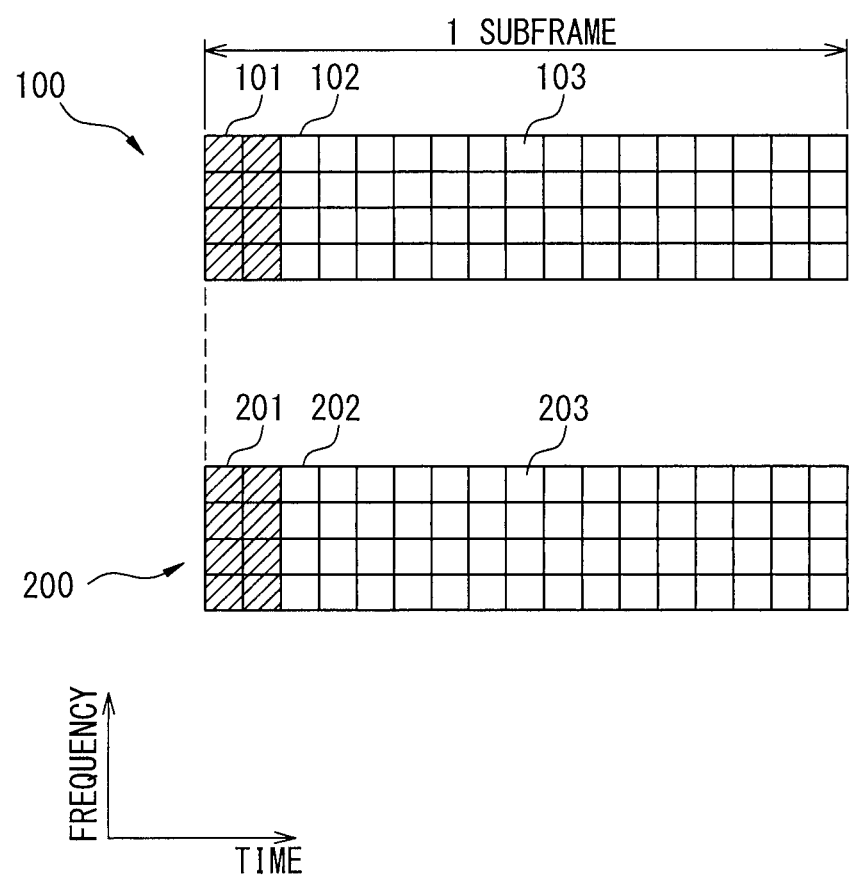
FIG. 8 is a drawing depicting a first example of arrangement of control channels in a transmission signal transmitted from each base station apparatus.

FIG. 8 is a drawing depicting a first example of arrangement of control channels in a downlink transmission signals which are transmitted from the first base station apparatus 3 and the second base station apparatus 4, respectively.

A referential mark 100 illustrates the transmission signal transmitted from the first base station apparatus 3, and a referential mark 200 illustrates the transmission signal transmitted from the second base station apparatus 4. One grid illustrates one resource block and the grids in one column illustrate the radio resource for one symbol length. An area in which hatching has been performed with the slash and an area in which hatching has been performed by the deep satin pattern form the range designated in advance as a range in which the radio resource for transmitting the control signal can be assigned. The area in which the hatching has been performed by the deep satin pattern illustrates a range which has been assigned as the radio resource on which the predetermined control signal is transmitted to the user equipment 5. A blank area illustrates a range where the transmission of the downlink signal by the second base station apparatus 4 is stopped. The area in which hatching has been performed by the weak satin pattern illustrates a range of the radio resource assigned to the data channel. Same can be applied to FIG. 9 and FIG. 10.

In the signal 100 transmitted from the first base station apparatus 3, the radio resources 101, 102, and 103 are assigned to the control channel, the control channel on which the predetermined control signal is transmitted to the user equipment 5, and the data channel, respectively. For example, the radio resource 102 may be limited by a unit of one symbol length. In the depicted example, the range of the radio resource 102 is limited to the symbol for one column of the symbols of three columns.

In the signal 200 transmitted from the second base station apparatus 4, the radio resources 201 and 203 are assigned to the control channel and the data channel, respectively. Moreover, in the range 202 which is the same as the radio resource 102, the second base station apparatus 4 does not transmit a downlink signal.

Figure 9:
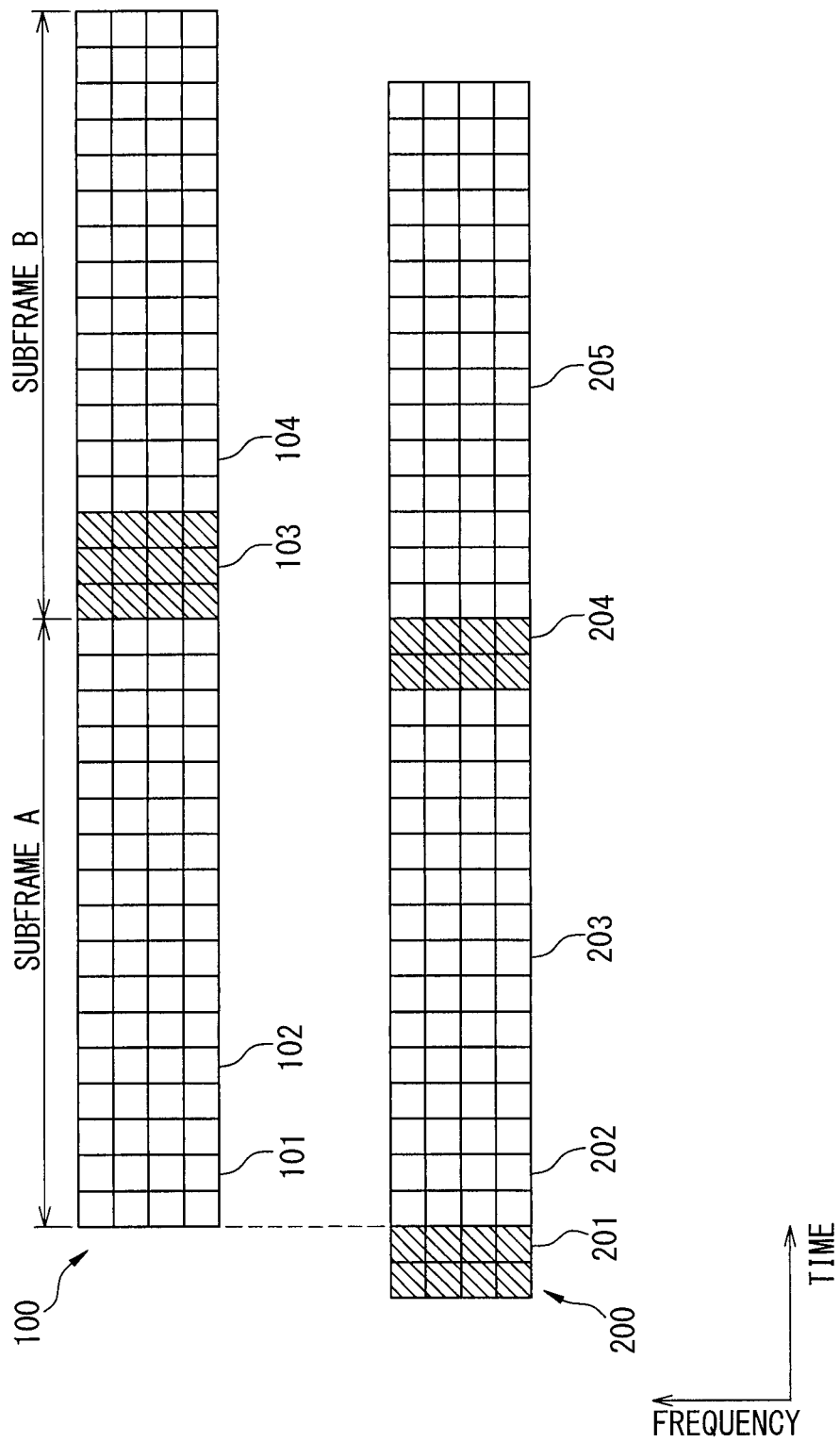
FIG. 9 is a drawing depicting a second example of arrangement of the control channels in the transmission signal transmitted from each base station apparatus.

FIG. 9 is a drawing depicting a second example of arrangement of the control channels in the downlink transmission signals which are transmitted from the first base station apparatus 3 and the second base station apparatus 4, respectively. In the signal 100 transmitted from the first base station apparatus 3, the radio resources 101 and 103 are assigned to the control channel on which the predetermined control signal is transmitted to the user equipment 5 and to the other control channel. Moreover, the radio resources 102 and 104 are assigned to the data channel.

For example, the radio resource 101 may be limited by a unit of subframe. In other words, the assigning unit 14 may limit the range of the radio resource 101 in such a way that a certain subframe includes the predetermined control signal to the user equipment 5 but other subframes do not include the predetermined control signal. In the depicted example, the subframe A includes the predetermined control signal to the user equipment 5, but the subframe B does not include the predetermined control signal to the user equipment 5.

In the signal 200 transmitted from the second base station apparatus 4, the radio resources 201 and 204 are assigned to the control channels, respectively. The radio resources 203 and 205 are assigned to the data channels, respectively. Moreover, in the range 202 which is same as the radio resource 101, the second base station apparatus 4 does not transmit the downlink signal.

Figure 10:
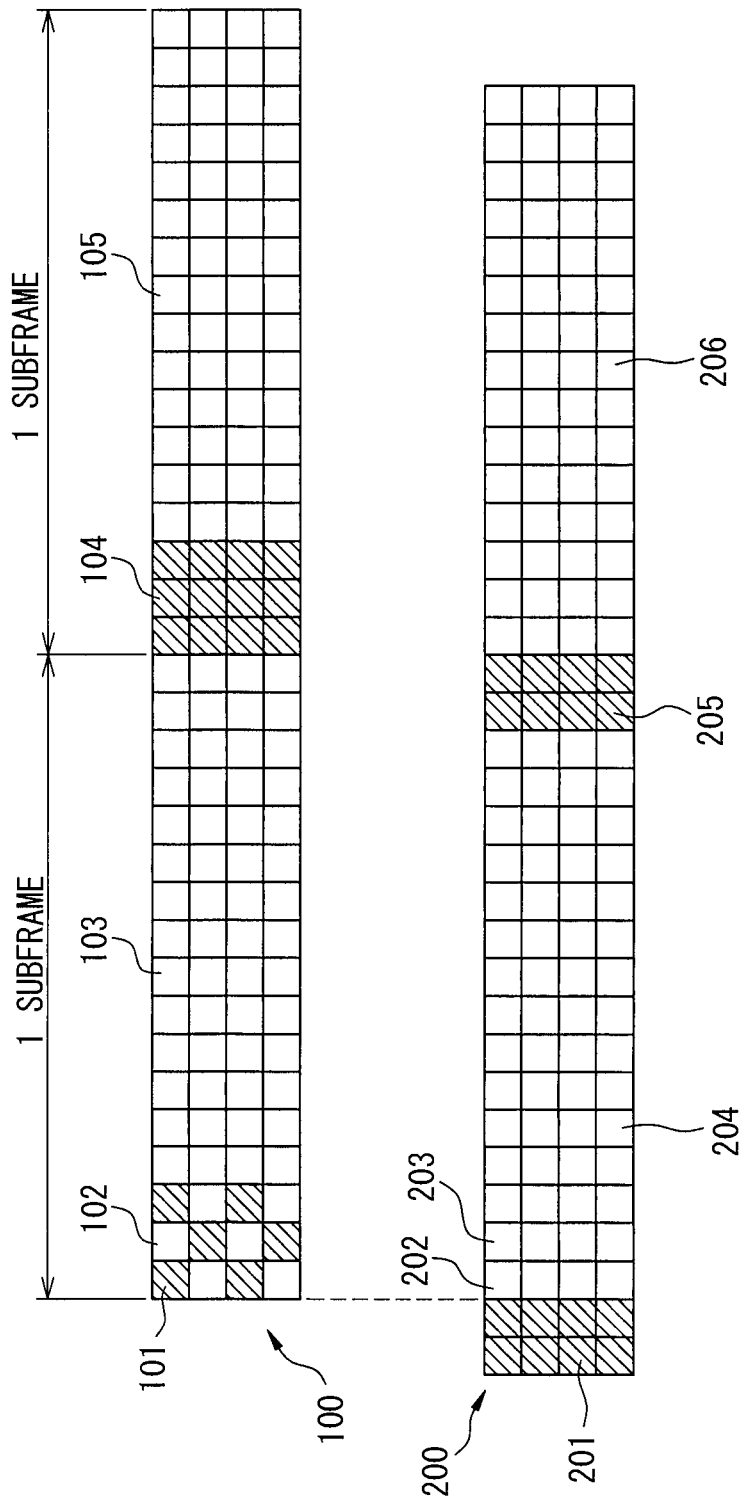
FIG. 10 is a drawing depicting a third example of arrangement of the control channels in the transmission signal transmitted from each base station apparatus.

FIG. 10 is a drawing depicting a third example of arrangement of control channels in the downlink transmission signal transmitted from the first base station apparatus 3 and the second base station apparatus 4. The radio resource 102 is assigned to the control channel on which the predetermined control signal is transmitted to the user equipment 5 in the signal 100 which is transmitted from the first base station apparatus 3. The radio resources 101 and 104 are assigned to other control channels. The radio resources 103 and 105 are assigned to the data channels. For example, the radio resource 101 may be limited by a unit of resource block.

In the signal 200 transmitted from the second base station apparatus 4, the radio resources 201 and 205 are assigned to the control channels, respectively. The radio resources 202, 204, and 206 are assigned to the data channels, respectively. Moreover, in the range 203 which is the same as the radio resource 102, the second base station apparatus 4 does not transmit the downlink signal.

According to the present embodiment, the period is limited in which the second base station apparatus 4 stops the transmission of the downlink signal, and therefore the throughput degradation of the downlink signal from the second base station apparatus 4 is reduced.

Figure 11:
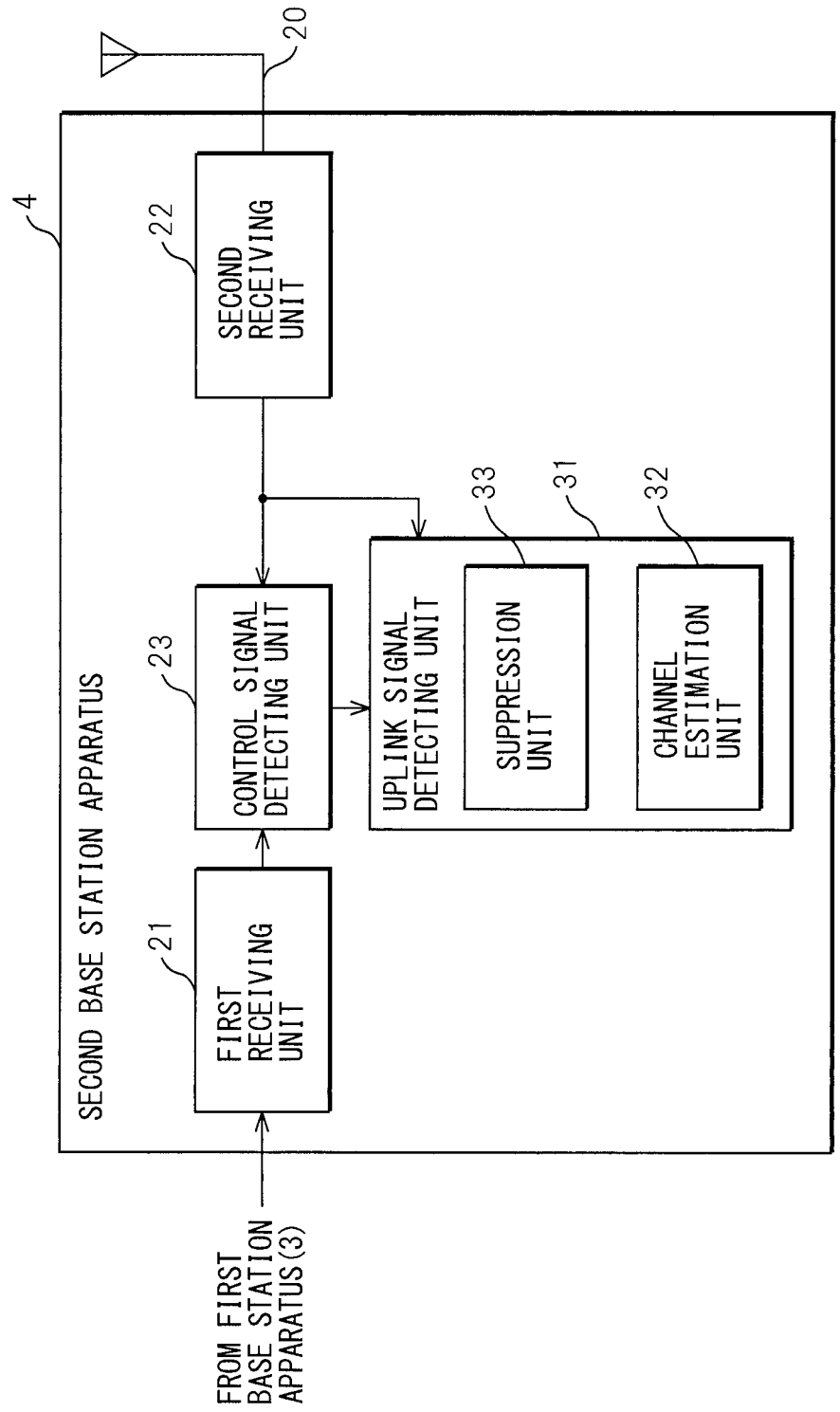
FIG. 11 is a schematic diagram depicting a third example of the second base station apparatus.

Next, still another embodiment of the second base station apparatus 4 will be described. FIG. 11 is a schematic diagram depicting a third example of the second base station apparatus 4. The second base station apparatus 4 includes the components which is similar to the components in above-described other embodiments. The same referential numbers are given to components corresponding to the components in other embodiments, and illustration of the same function is omitted. Moreover, the components of the present embodiment may be combined with the components in other following embodiments.

The second base station apparatus 4 may include an uplink signal detecting unit 31 which detects the uplink signal transmitted from the user equipment in the second cell 9. For example, in LTE, the uplink signal detecting unit 31 may detect PUSCH (Physical Uplink Shared Channel). The uplink signal detecting unit 31 includes a channel estimation unit 32 and a suppression unit 33.

The channel estimation unit 32 performs a channel estimation of the transmission channel through which the uplink signal of the user equipment in the second cell 9 is transmitted. The channel estimation unit 32 also performs a channel estimation of the transmission channel through which the uplink signal of the user equipment 5 is transmitted. When the channel estimation is performed for the transmission channel through which the uplink signal of the user equipment 5 is transmitted, the channel estimation unit 32 uses the parameter included in the predetermined control information which is detected by the control signal detecting unit 23.

The parameter used for the channel estimation may be the radio resource information which includes the transmission timing at which the uplink signal is transmitted from the user equipment 5, and information which instructs the reference signal used for the channel estimation, for example. The information which instructs the reference signal may be information which instructs a reference signal series, for example. The information which instructs the signal series may be number of CAZAC (Constant Amplitude, Zero Auto-Correlation) sequence, for example. Other information may be used as the information which instructs the reference signal, and it is not limited to the above-described example. For example, as the reference signal series, other signal series such as Zadoff-Chu CAZAC can be used.

The suppression unit 33 suppresses the interference by the uplink signal of the user equipment 5 to the uplink signal of the user equipment in the second cell 9, based on the result of the channel estimation by the channel estimation unit 32.

Figure 12:
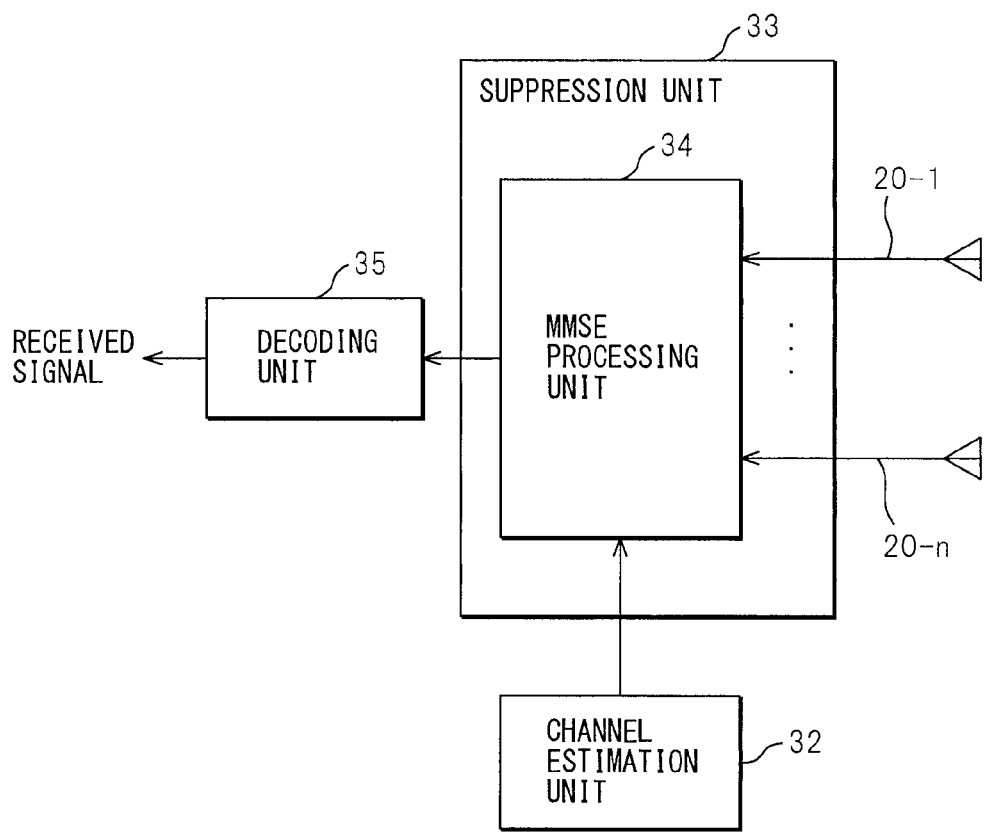
FIG. 12 is a schematic diagram depicting a first example of a suppression unit illustrated in FIG. 11.

FIG. 12 is a schematic diagram depicting a first example of the suppression unit 33 illustrated in FIG. 11. The suppression unit 33 performs the interference suppression between the received signals by an MMSE (Minimum Mean Squared Error) method. The suppression unit 33 includes an MMSE processing unit 34. The MMSE processing unit 34 generates a channel matrix from the channel estimation value estimated by the channel estimation unit 32 using the reference signal.

The MMSE processing unit 34 decides the weighting factor to suppress the interference from other user equipment for every user equipment based on the channel matrix, multiplies the weighting factor by the received signal of the multiantennas 20-1 to 20-n which are provided as the receiving antenna 20, and thereby suppressing interference with an MMSE equalization for every user equipment. The signal after equalization is decoded by the decoding unit 35.

Figure 13:
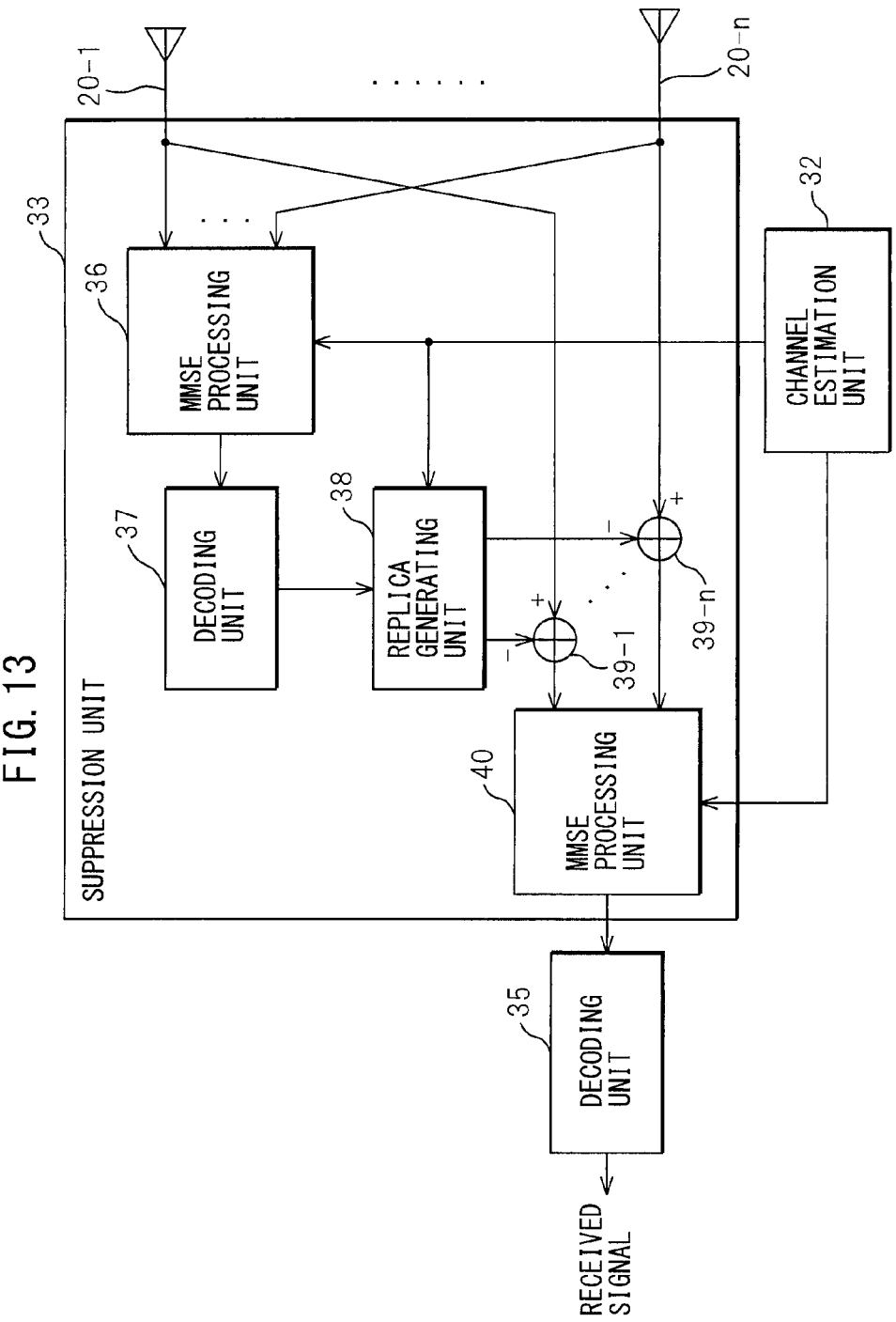
FIG. 13 is a schematic diagram depicting a second example of the suppression unit illustrated in FIG. 11.

FIG. 13 is a schematic diagram depicting a second example of the suppression unit 33 illustrated in FIG. 11. The suppression unit 33 performs the interference suppression between the received signals by an MMSE-SIC (Successive Interference Canceller) method. The suppression unit 33 includes a first MMSE processing unit 36, a decoding unit 37, a replica generating unit 38, subtractors 39-1 to 39-n, and a second MMSE processing unit 40.

The first MMSE processing unit 36 performs the interference suppression by the MMSE equalization for every user equipment, as is the case with the above-described MMSE processing unit 34. The decoding unit 37 reproduces the transmission signal from the user equipment 5 by decoding the signal after equalization. The replica generating unit 38 generates an interference replica of the transmission signal of the user equipment 5 based on the reproduced signal and the channel estimation value. The subtractors 39-1 to 39-n remove, from the received signal, the interference which is from the user equipment 5, by subtracting the interference replica signal from the received signal. The second MMSE processing unit 40 performs the MMSE equalization to the received signal from which the interference from the user equipment 5 has been removed.

Figure 14:
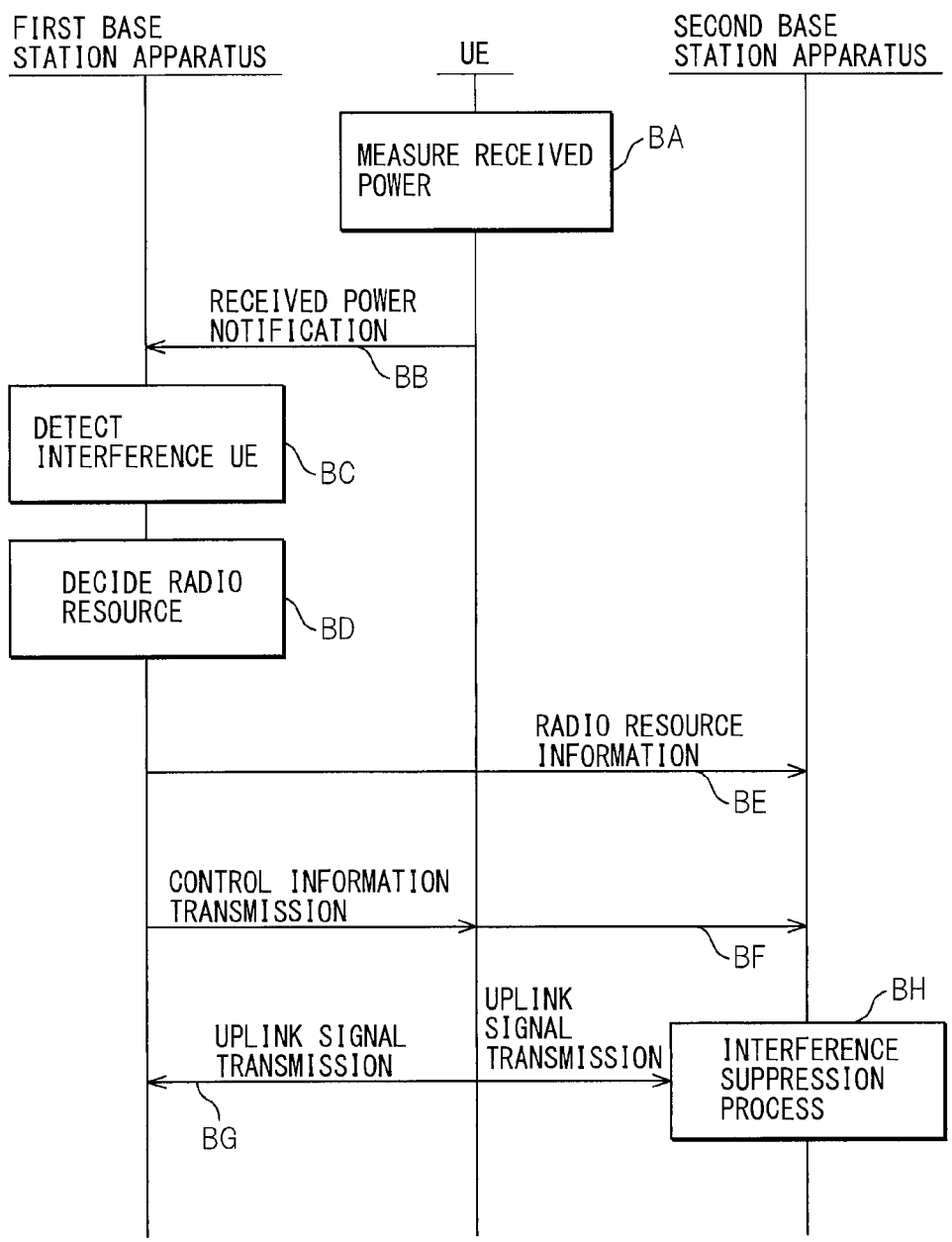
FIG. 14 is an explanatory diagram of a third example of processes in the first base station apparatus and the second base station apparatus.

FIG. 14 is an explanatory diagram of a third example of a process in the first base station apparatus 3 and the second base station apparatus 4. Note that each of following operations BA to BH may be a step in other embodiments.

In the operation BA, the user equipment 5 measures the received power of the signal transmitted from the second base station apparatus 4. In the operation BB, the user equipment 5 notifies the first base station apparatus 3 of the measured received power intensity. The radio receiving unit 16 of the first base station apparatus 3 receives the signal which indicates the received power intensity of the signal from each base station apparatus measured by the user equipment 5.

In the operation BC, the detecting unit 17 determines whether or not the interference affected to the second base station apparatus 4 satisfies the predetermined first condition, according to the received power intensity measured by the user equipment 5. When the predetermined first condition is satisfied, the detecting unit 17 detects the user equipment 5 as an "interference UE" which causes large interference to the second base station apparatus 4.

In the operation BD, the assigning unit 14 assigns the radio resource to the channel on which the predetermined control signal generated for the user equipment 5 is transmitted. In the operation BE, the first transmitting unit 15 of the first base station apparatus 3 transmits the radio resource information to the second base station apparatus 4. The first receiving unit 21 of the second base station apparatus 4 receives the radio resource information.

In the operation BF, the radio transmitting unit 11 of the first base station apparatus 3 transmits the predetermined control signal generated for the user equipment 5 on the radio resource assigned by the assigning unit 14. The control signal detecting unit 23 of the second base station apparatus 4 detects the predetermined control information transmitted on the radio resource indicated by the radio resource information which is received by the first receiving unit 21.

In the operation BG, the user equipment 5 transmits the uplink signal. In the operation BH, the channel estimation unit 32 of the second base station apparatus 4 performs a channel estimation of the transmission channel on which the uplink signal is transmitted from the user equipment 5, based on the predetermined control signal generated for the user equipment 5. When the second base station apparatus 4 receives the uplink signal transmitted from the user equipment in the second cell 9, the suppression unit 33 performs an interference suppression process on the uplink signal transmitted from the user equipment 5, based on the result of channel estimation.

According to the present embodiment, the second base station apparatus 4 performs the channel estimation of the transmission channel which uplink signal is transmitted from the user equipment 5 in the adjacent cell 8, and can receive with interference suppression using the receiving multiantenna. By this means, it is possible to prevent or reduce degradation of the receiving characteristic affected by the interference to the uplink signal which comes from the user equipment 5.

Figure 15:
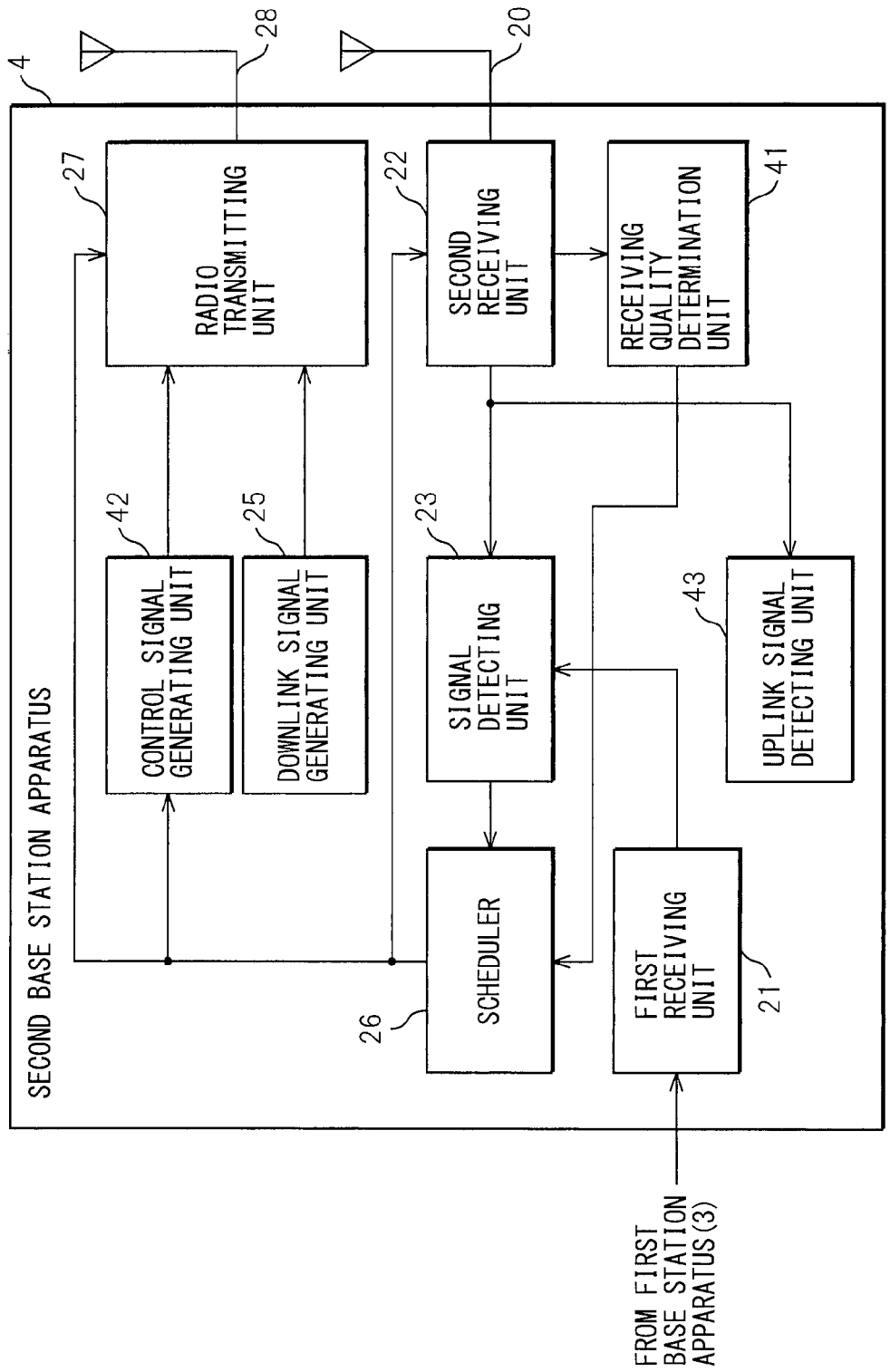
FIG. 15 is a schematic diagram depicting a fourth example of the second base station apparatus.

Next, yet another embodiment of the second base station apparatus 4 will be described. In the present embodiment, the second base station apparatus 4 performs scheduling of communication in the second cell 9 based on the predetermined control information transmitted to the user equipment 5 in the adjacent cell 8. FIG. 15 is a schematic diagram depicting a fourth example of the second base station apparatus. The second base station apparatus 4 includes the components which is similar to the components in above-described other embodiments. The same referential numbers are given to the components corresponding to the components in other embodiments, and illustration of the same function is omitted. Moreover, the components of the present embodiment may be combined with the components in other embodiments described below.

The second base station apparatus 4 includes a receiving quality determination unit 41, a control signal generating unit 42, and an uplink signal detecting unit 43. The receiving quality determination unit 41 determines the receiving quality of the communication between the second base station apparatus 4 and the user equipment in the second cell 9. The receiving quality to be determined may be receiving quality of the uplink signal which the second base station apparatus 4 receives.

When determining the receiving quality of the uplink signal which the second base station apparatus 4 receives, the receiving quality determination unit 41 may measure the receiving quality of the uplink signal which the second base station apparatus 4 receives. When determining the receiving quality of the downlink signal which the user equipment receives, the receiving quality determination unit 41 may receive a known reference signal, and may measure receiving quality.

The control signal generating unit 42 generates the predetermined control signal for controlling the transmission of the uplink signal by the user equipment in the second cell 9. The uplink signal detecting unit 43 detects the uplink signal transmitted from the user equipment in the second cell 9.

The scheduler 26 decides parameters, such as a radio resource of the communication of the uplink signal with the user equipment in the second cell 9, a modulation scheme, and a coding rate. The radio transmitting unit 27 and the second receiving unit 22 transmit and receive the radio signal to/from the user equipment in the second cell 9, in accordance with the parameters determined by the scheduler 26. Moreover, the control signal generating unit 42 generates the control signal for controlling the user equipment in the second cell 9 in accordance with the parameters determined by the scheduler 26.

The scheduler 26 inputs the predetermined control signal which is transmitted to the user equipment 5 and detected by the control signal detecting unit 23. The predetermined control signal may be information for designating the radio resource assigned to the channel on which the user equipment 5 transmits the uplink signal. The scheduler 26 assigns the radio resource to the user equipment which satisfies the second condition among the user equipment in the second cell 9. The second condition may be a condition whether or not the resistance to the interference radio wave satisfies a predetermined condition, for example.

In order to determine whether or not the resistance to the interference radio wave satisfies the predetermined condition, for example, it may be determined whether or not the receiving quality determined by the receiving quality determination unit 41 for the user equipment of the determination object satisfies the predetermined condition. For example, when the determined receiving quality is higher than a predetermined threshold value, it may determine that the resistance to the interference radio wave satisfies the predetermined condition, and satisfies the above-mentioned second condition. Moreover, when the determined receiving quality is at least a predetermined threshold value larger than the averaged receiving quality of all user equipment in the second cell 9, it may determine that the resistance to the interference radio wave satisfies the predetermined condition. Other various conditions may be adopted as the determining conditions for the receiving quality.

Moreover, in order to determine whether or not the resistance to the interference radio wave satisfies the predetermined condition, for example, it may be determined that the quality of service (QoS) designated for the communication with the user equipment of the determination object satisfies a predetermined condition. For example, when QoS designated for certain user equipment is lower than a predetermined threshold value, it may be determined that the resistance to the interference radio wave satisfies the predetermined condition. Other various conditions may be adopted as the determining conditions for QoS.

The above-mentioned second condition may be determined by other various conditions, and are not limited to the above-described example.

Figure 16:
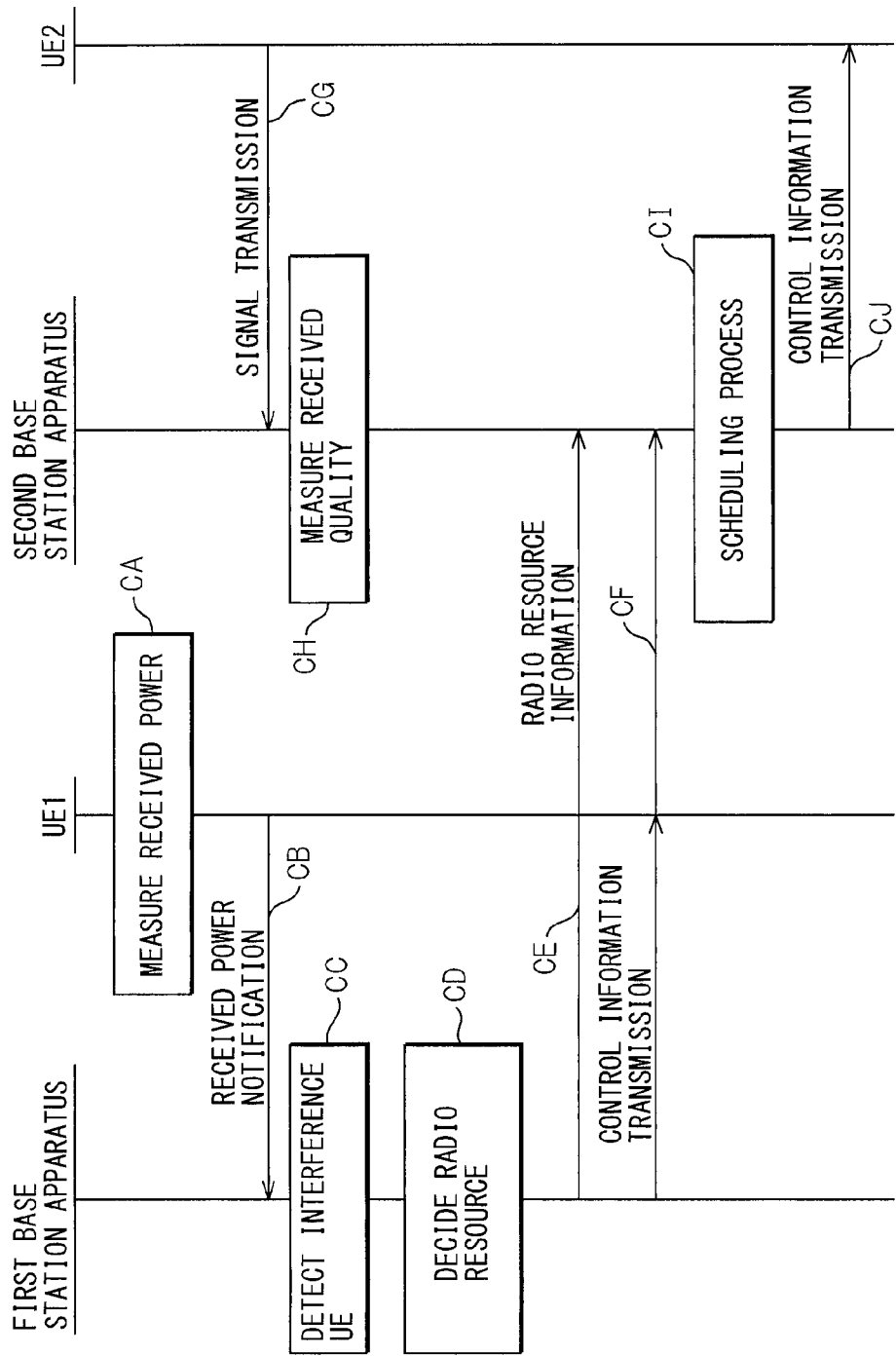
FIG. 16 is an explanatory diagram of a fourth example of processes in the first base station apparatus and the second base station apparatus.

FIG. 16 is an explanatory diagram of a fourth example of processes in the first base station apparatus 3 and the second base station apparatus 4. Note that each of following operations CA to CJ may be a step in other embodiments.

The processes of the operations CA to CF may be substantially the same as the operations BA to BF which are described with reference to FIG. 14. In the operation CG, the user equipment in the second cell 9 transmits the uplink signal to the second base station apparatus 4. In the operation CH, the receiving quality determination unit 41 of the second base station apparatus 4 measures the receiving quality of the uplink signal transmitted from the user equipment. The operations CG and CH may be performed any time, as long they both occur before the scheduling process in operation CI described below.

In the operation CI, the scheduler 26 performs the scheduling process which decides the parameters, such as a radio resource of the communication of the uplink signal with the user equipment in the second cell 9, a modulation scheme, and a coding rate. The scheduler 26 assigns the radio resource designated by the predetermined control signal detected by the control signal detecting unit 23 to the user equipment which satisfies the second condition among the user equipment in the second cell 9.

In the operation CJ, the control signal generating unit 42 generates the control signal for controlling the user equipment in the second cell 9 in accordance with the parameters decided by the scheduler 26. The control signal is transmitted to the user equipment in the second cell 9.

According to the present embodiment, the second base station apparatus 4 can perform scheduling of communication in the second cell 9 based on the information on the radio resource on which it is expected that the uplink signal is transmitted from the user equipment 5 in the adjacent cell 8. Therefore, the scheduling process can be performed, which assigns the radio resource to the user equipment with strong resistance to the interference radio wave from the user equipment 5 in the adjacent cell 8. As a result, it is possible to avoid interference of the user equipment with weak resistance to the interference radio wave, and the receiving quality degrades greatly.

Next, still another embodiment of the second base station apparatus 4 will be described. In the present embodiment, the second base station apparatus 4 performs an adaptive modulation and coding (AMC) process for communication in the second cell 9 based on the predetermined control information transmitted to the user equipment 5 in the adjacent cell 8.

Figure 17:
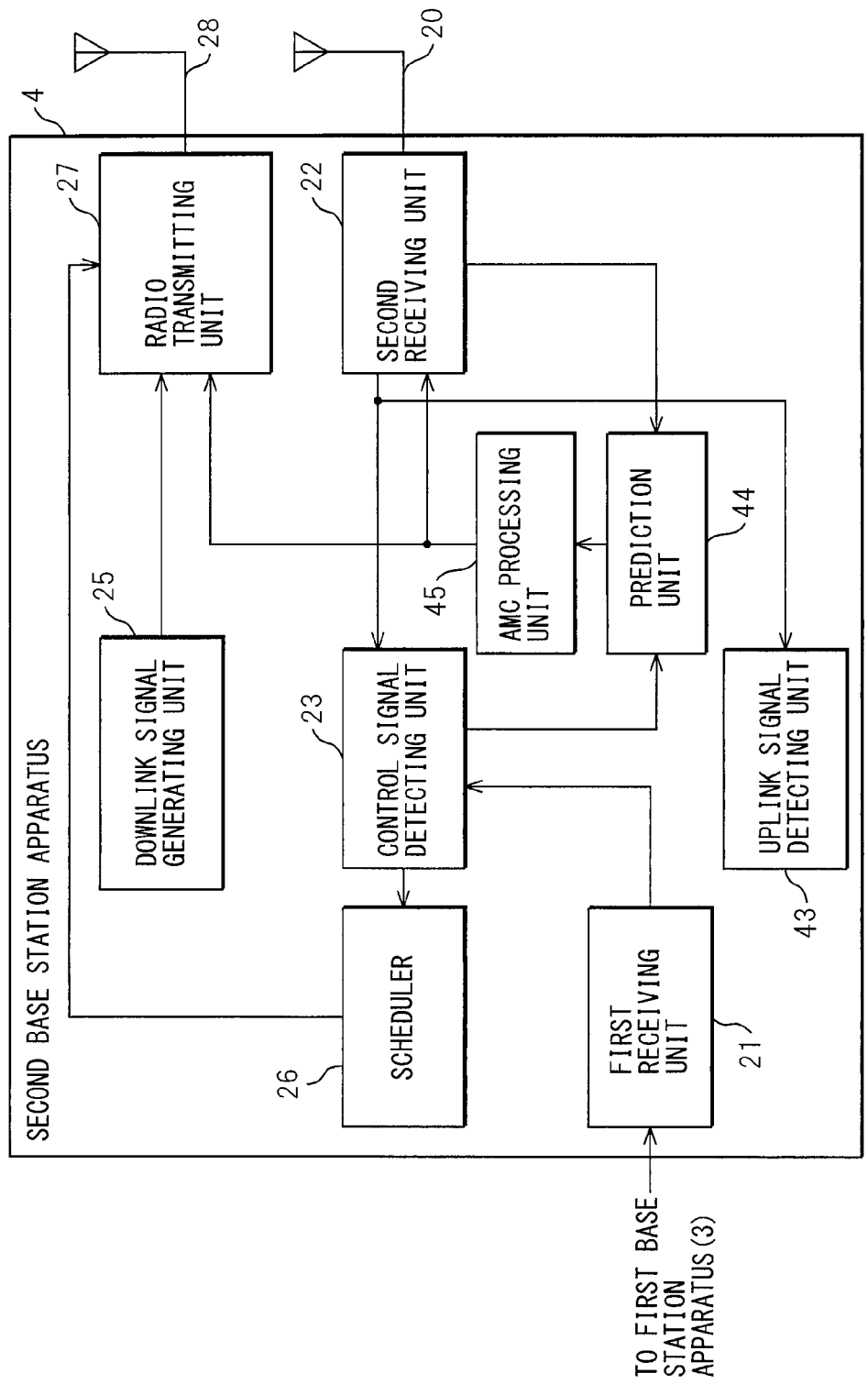
FIG. 17 is a schematic diagram depicting a fifth example of the second base station apparatus.

FIG. 17 is a schematic diagram depicting a fifth example of the second base station apparatus 4. The second base station apparatus 4 includes the components which is similar to the components in above-described other embodiments. The same referential marks are given to the components corresponding to the components in other embodiments, and illustration is omitted about the same function. Moreover, the components of the present embodiment may be combined with the components in other embodiments described below.

The second base station apparatus 4 includes a prediction unit 44 and an AMC processing unit 45. The prediction unit 44 inputs the predetermined control signal which is transmitted to the user equipment 5 and detected by the control signal detecting unit 23. The predetermined control signal may be information by which the user equipment 5 designates the radio resource assigned to the channel for transmitting the uplink signal.

The prediction unit 44 predicts the receiving quality for the radio resource designated by the predetermined control signal. For example, the prediction unit 44 may predict the receiving quality by subtracting a predetermined amount of prediction change from the current receiving quality. Moreover, for example, the prediction unit 44 may store history of the amount of change of the receiving quality produced at the radio resource designated by the predetermined control signal. Then, the prediction unit 44 may subtract the amount of prediction change calculated by performing a statistical process on the stored amount of change from the current receiving quality to predict receiving quality. Other various methods may be used as the prediction method of receiving quality.

The AMC processing unit 45 performs the adaptive modulation and coding process for the user equipment to which the radio resource designated by the predetermined control signal is assigned, based on the predicted receiving quality. In other words, the AMC processing unit 45 decides parameters, such as a modulation scheme of the uplink communication with the user equipment to which the radio resource designated by the predetermined control signal is assigned, and a coding rate, based on the predicted receiving quality.

The radio transmitting unit 27 transmits an AMC indication signal which designates the parameters decided by the AMC processing unit 45 to the user equipment in the second cell 9. Moreover, the second receiving unit 22 receives the uplink signal transmitted from the user equipment in the second cell 9 in accordance with the parameter decided by the AMC processing unit 45.

Figure 18:
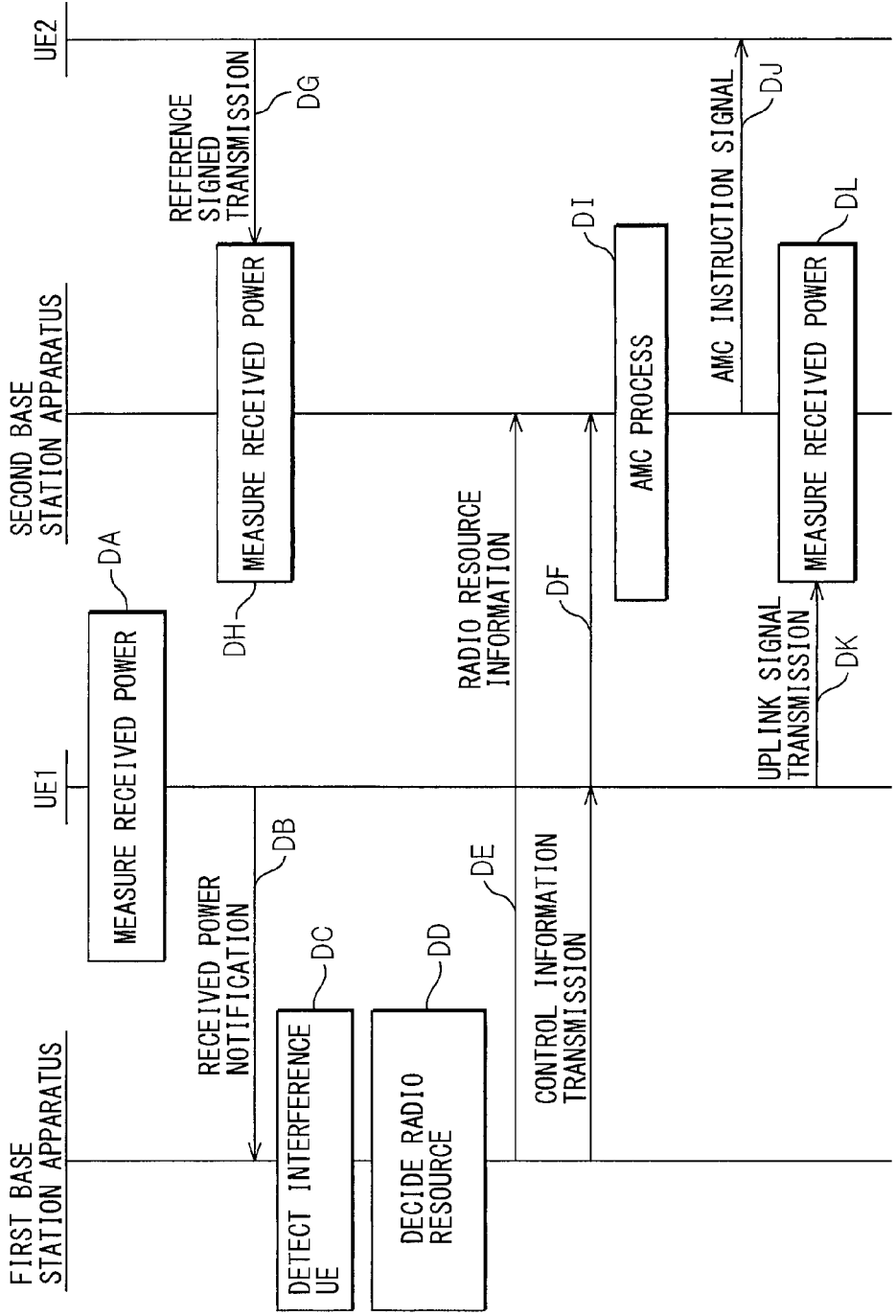
FIG. 18 is an explanatory diagram of a fifth example of processes in the first base station apparatus and the second base station apparatus.

FIG. 18 is an explanatory diagram of a fifth example of processes in the first base station apparatus 3 and the second base station apparatus 4. Note that each of following operations DA to DL may be a step in other embodiments.

The processes of the operations DA to DF may be substantially same as the operations BA to BF which are described with reference to FIG. 14. In the operation DG, the user equipment in the second cell 9 transmits the reference signal for received power measurement to the second base station apparatus 4. In the operation DH, the prediction unit 44 decides the current receiving quality based on the received power which is measured. Note that the operations DG and DH may be performed any time, as long as it is before the adaptive modulation and coding process in the operation DI described below.

In the operation DI, the prediction unit 44 inputs the predetermined control signal transmitted to the user equipment 5. The prediction unit 44 predicts the receiving quality in the radio resource designated by the predetermined control signal, by subtracting the expected amount of change from the current receiving quality. The AMC processing unit 45 performs the adaptive modulation and coding process for the communication with the user equipment to which the radio resource designated by the predetermined control signal is assigned, based on the predicted receiving quality.

In the operation DJ, the radio transmitting unit 27 transmits the AMC indication signal to the user equipment in the second cell 9. In the operation DK, when the user equipment 5 transmits the uplink signal, the second receiving unit 22 receives the uplink signal transmitted from the user equipment in the second cell 9 in accordance with the parameter determined by the AMC processing unit 45.

In the operation DL, the prediction unit 44 stores the actual amount of change produced by interference by the user equipment 5, and uses the amount for prediction of the receiving quality.

According to the present embodiment, the second base station apparatus 4 can perform the adaptive modulation and coding process for the communication in which the radio resource is assigned, based on the information on the radio resource on which the uplink signal is expected to be transmitted from the user equipment 5 in the adjacent cell 8. Therefore, it is possible to perform a modulation and coding process which is strong against interference from the user equipment 5 in the adjacent cell 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A first base station apparatus which forms a first cell, the first base station apparatus comprising:
   an assigning unit configured to assign a radio resource for a control channel between a mobile station apparatus and the first base station apparatus;
   a first transmitting unit configured to transmit radio resource information indicating the radio resource assigned for the control channel to the second base station apparatus forming a second cell which is different from the first cell; and
   a detecting unit configured to detect a mobile station apparatus which satisfies a first condition of interference caused by the mobile station apparatus,
   wherein:
   the second cell comprises a cell adjacent to the first cell, or a cell of a communication area of which partly overlaps with a communication area of the first cell,
   the first transmitting unit is further configured to transmit the radio resource information which indicates the radio resource assigned for the control channel between a detected mobile station apparatus and the first base station apparatus, and transmit an identifier of the mobile station apparatus to which the radio resource indicated by the radio resource information is assigned, to the second base station apparatus, and
   the assigning unit is configured to limit the radio resource assigned for the control channel between the mobile station apparatus and the first base station apparatus to a reduced range of the radio resource which can be assigned.

2. A communication method used in a first base station apparatus which forms a first cell, comprising:
   assigning a radio resource for a control channel between a mobile station apparatus and the first base station apparatus;
   transmitting radio resource information indicating the radio resource assigned for the control channel to the second base station apparatus forming a second cell which is different from the first cell, wherein:
   the second cell comprises a cell adjacent to the first cell, or a cell of a communication area of which partly overlaps with a communication area of the first cell, together with an identifier of the mobile station apparatus to which the radio resource indicated by the radio resource information is assigned, to the second base station apparatus;
   detecting a mobile station apparatus which satisfies a first condition of interference caused by the mobile station apparatus, and transmitting the radio resource information which indicates the radio resource assigned for the control channel between a detected mobile station apparatus and the first base station apparatus, to the second base station apparatus; and limiting the radio resource assigned for the control channel between the mobile station apparatus and the first base station apparatus to a reduced range of the radio resource which can be assigned.

\* \* \* \* \*